(12) United States Patent
Zambrano et al.

(10) Patent No.: US 7,215,039 B2
(45) Date of Patent: May 8, 2007

(54) BUILDING INCORPORATING A WIND TURBINE SYSTEM

(75) Inventors: Thomas Zambrano, Long Beach, CA (US); Tyler MacCready, Altadena, CA (US); Stel N. Walker, Corvalis, OR (US)

(73) Assignee: AeroVironment, Inc., Monrovia, CA (US)

( * ) Notice: Subject to any disclaimer, the term of this patent is extended or adjusted under 35 U.S.C. 154(b) by 0 days.

(21) Appl. No.: 11/375,313

(22) Filed: Mar. 13, 2006

(65) Prior Publication Data

US 2006/0170222 A1    Aug. 3, 2006

Related U.S. Application Data

(63) Continuation of application No. 10/838,434, filed on May 3, 2004.

(51) Int. Cl.
*F03D 9/00* (2006.01)

(52) U.S. Cl. ........................................................ 290/55
(58) Field of Classification Search ...................... None
See application file for complete search history.

(56) References Cited

U.S. PATENT DOCUMENTS

| | | | |
|---|---|---|---|
| 3,707,812 A * | 1/1973 | Roessl | 290/55 |
| 3,832,853 A | 9/1974 | Butler, Jr. | |
| 3,956,902 A | 5/1976 | Fields, Jr. | |
| 4,068,132 A * | 1/1978 | Bardekoff | 290/55 |
| 4,321,476 A | 3/1982 | Buels | |
| 5,272,378 A | 12/1993 | Wither | |
| 5,394,016 A | 2/1995 | Hickey | |
| 6,041,596 A | 3/2000 | Royer | |
| 6,765,309 B2 * | 7/2004 | Tallal et al. | 290/55 |
| 2003/0056506 A1 | 3/2003 | Cutcher | |
| 2005/0180851 A1 | 8/2005 | Gordon | |

FOREIGN PATENT DOCUMENTS

| | | | |
|---|---|---|---|
| DE | 29 51 085 A1 | | 6/1981 |
| GB | 2404700 A | * | 2/2005 |
| JP | 2001193631 A | * | 7/2001 |
| JP | 2005207288 A | * | 8/2005 |

* cited by examiner

*Primary Examiner*—Joseph Waks
(74) *Attorney, Agent, or Firm*—Sheppard, Mullin, Richter & Hampton LLP (57) ABSTRACT

Wind turbine system, and related method, is provided that exploits an aerodynamically enhanced wind zone of a structure by aligning a wind turbine generator, and preferably a plurality thereof, along a wall thereof. Each generator includes a structural support, a wind turbine rotor and a generator set. The system includes a mounting assembly that attaches the generators to the upper edge of a wall of the building and that allows for easy retrofit attachment to existing structures. The system includes a busway extending along the mounting assembly and configured to provide electrical contact between the generator assembly and the electrical infrastructure of the building. Preferably, the generator assembly is mounted such that the rotor's axis of rotation is in a generally horizontal orientation. The system may further include a fairing attached to the mounting assembly and configured to extend outward from a front side of the wall. The fairing can be provided with a downwardly curved planar shape to facilitate airflow towards the rotors.

17 Claims, 12 Drawing Sheets

BUILDING INCORPORATING A WIND TURBINE SYSTEM

CROSS-REFERENCE TO RELATED APPLICATIONS

This is a continuation of prior U.S. patent application Ser. No. 10/838,434, filed May 3, 2004.

BACKGROUND OF THE INVENTION

The present invention relates generally to wind turbines and, more particularly, to wind turbines for use in small-scale applications. The present invention also relates to a method of using wind turbines in small-scale applications.

Electrical generation from environmentally friendly sources, or "alternative energy sources," has long been a goal of many, for both environmental and economic concerns. Wind-powered generators have been used for this purpose. Generally speaking, wind turbines transfer the wind's kinetic energy into electrical energy. This has been achieved by exposing a rotor to wind. The rotor turns a generator typically mounted aft of the rotor, driving the generator to create electricity. The rotor and generator combination (i.e., wind turbine generator) is mounted at the top of a tower high above the ground to expose it to high winds. The tower is attached to a foundation and is configured to endure significant structural loads.

Government incentives exist promoting the use of alternative sources of electricity, in both utility-scale and small-scale applications. Wind turbine generators have been particularly successful in utility-scale applications. In such applications, fields of large wind turbine generators are used. These wind turbines can exceed a height of 200 feet. Some utility-scale installations generate in excess of 100 megawatts. However, such installations are very costly. A number of factors must properly align to make such an investment worthwhile, including location, government incentives, electricity costs, and turbine costs. Thus, utility-scale installations can play an important, but not exclusive role, as an alternative source of electricity.

Wind turbine generators have also been used in small-scale applications, typically ranging between 50 watts and 100 kilowatts. Even for small-scale applications, a number of factors must be satisfied to make the investment worthwhile. For example, proper location and mounting of wind generators can be an issue. In many current approaches, a single, relatively small, wind turbine is mounted on a tower away from other structures such that the turbine is spaced away from turbulent flow caused by such structures. Thus, current approaches are typically limited to rural settings and are impractical in many other settings.

It should, therefore, be appreciated that there exists a need for a wind turbine system for use in small-scale applications in a broad range of settings, including industrial settings, that is cost-effective, environmentally safe, and does not hamper other systems. The present invention fulfills this need and others.

SUMMARY OF THE INVENTION

The invention is embodied in a wind turbine system that exploits an aerodynamically enhanced wind zone of a building by aligning a wind turbine generator, and preferably a plurality thereof, along the leading edge of its roofline. Each generator includes a structural support, a wind turbine rotor, and a generator set. The system includes a mounting assembly that attaches the generators to the upper edge of a wall of the building and that allows for easy retrofit attachment to existing structures. The system includes a busway extending along the mounting assembly and configured to provide electrical contact between the generator assembly and the electrical infrastructure of the building.

Preferably, the generator assembly is mounted such that the rotor's axis of rotation is in a generally horizontal orientation. The system may further include a fairing attached to the mounting assembly and configured to extend outward from a front side of the wall. The fairing can be provided with a downwardly curved planar shape to facilitate airflow towards the rotors.

In a preferred embodiment, the wall attachment includes front and rear arms spaced are apart from one another to receive the upper end of the wall. The mounting assembly can further include a compression plate configured to securely engage the rear side of the wall and adjustably attached to the rear arm of the wall attachment.

In another preferred embodiment, the wall attachment includes a rear arm configured to be secured directly to the rear side of the wall.

For purposes of summarizing the invention and the advantages achieved over the prior art, certain advantages of the invention have been described herein above. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
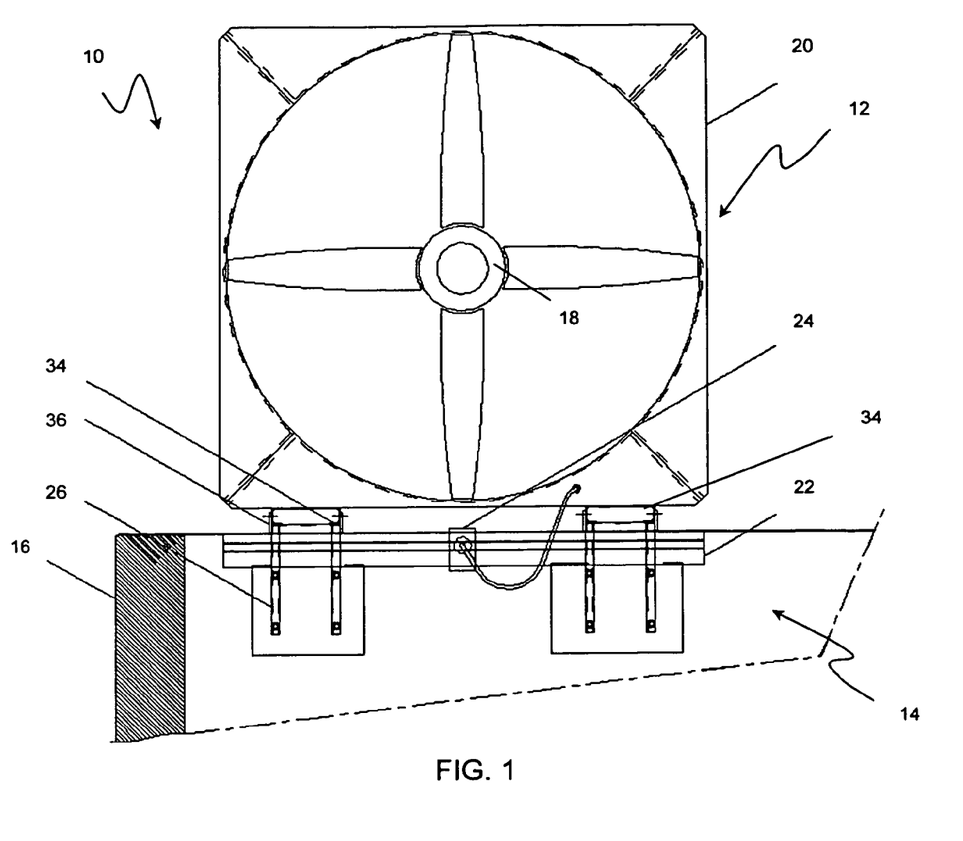
FIG. 1 is a rear elevational view of a first embodiment of a wind turbine system in accordance with the present invention, depicting a generator and mounting assembly for compression mounting to a wall.

With reference to the illustrative drawings, and particularly to FIG. 1, there is shown a wind turbine system 10, including a generator 12 and a mounting assembly 14 for attaching the assembly to a wall 16. The wind turbine system preferably includes a plurality of wind turbine generators attached along a leading edge of a vertical wall, thereby exploiting an enhanced wind zone created as wind accelerates over the wall. Each generator includes a wind turbine rotor 18 and generator set (not shown) disposed in a structural support, e.g., box housing 20. The rotor drives the generator set, inducing the generation of electrical current. Each generator is configured to generate power in a range of about 50–100 watts and is in electrical contact with a DC busway 22 by an interconnect, e.g., plug 24. The DC busway feeds power to an inverter/controller (not shown) that interfaces with the building electricity infrastructure. Thus, the mounting assembly serves as both a structural and an electrical interface between the building and the generators. Moreover, the system can be easily scaled for use in many different installations.

Figure 2:
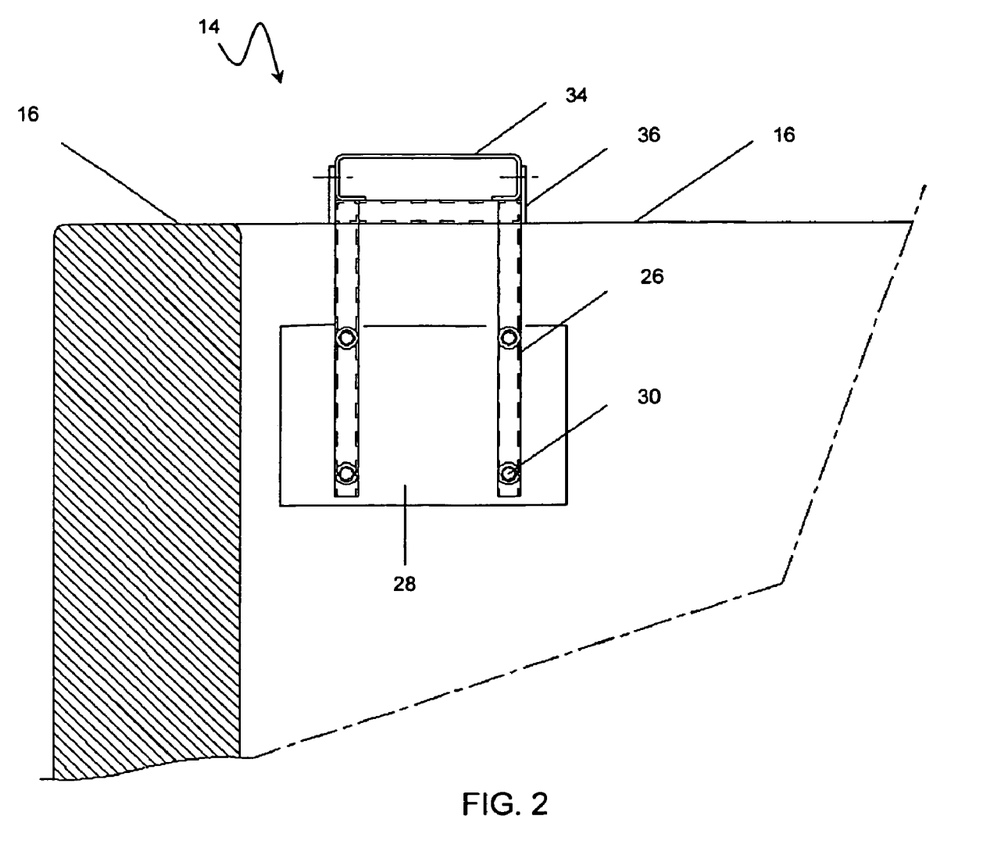
FIG. 2 is elevational view of the mounting assembly of FIG. 1.
Figure 3:
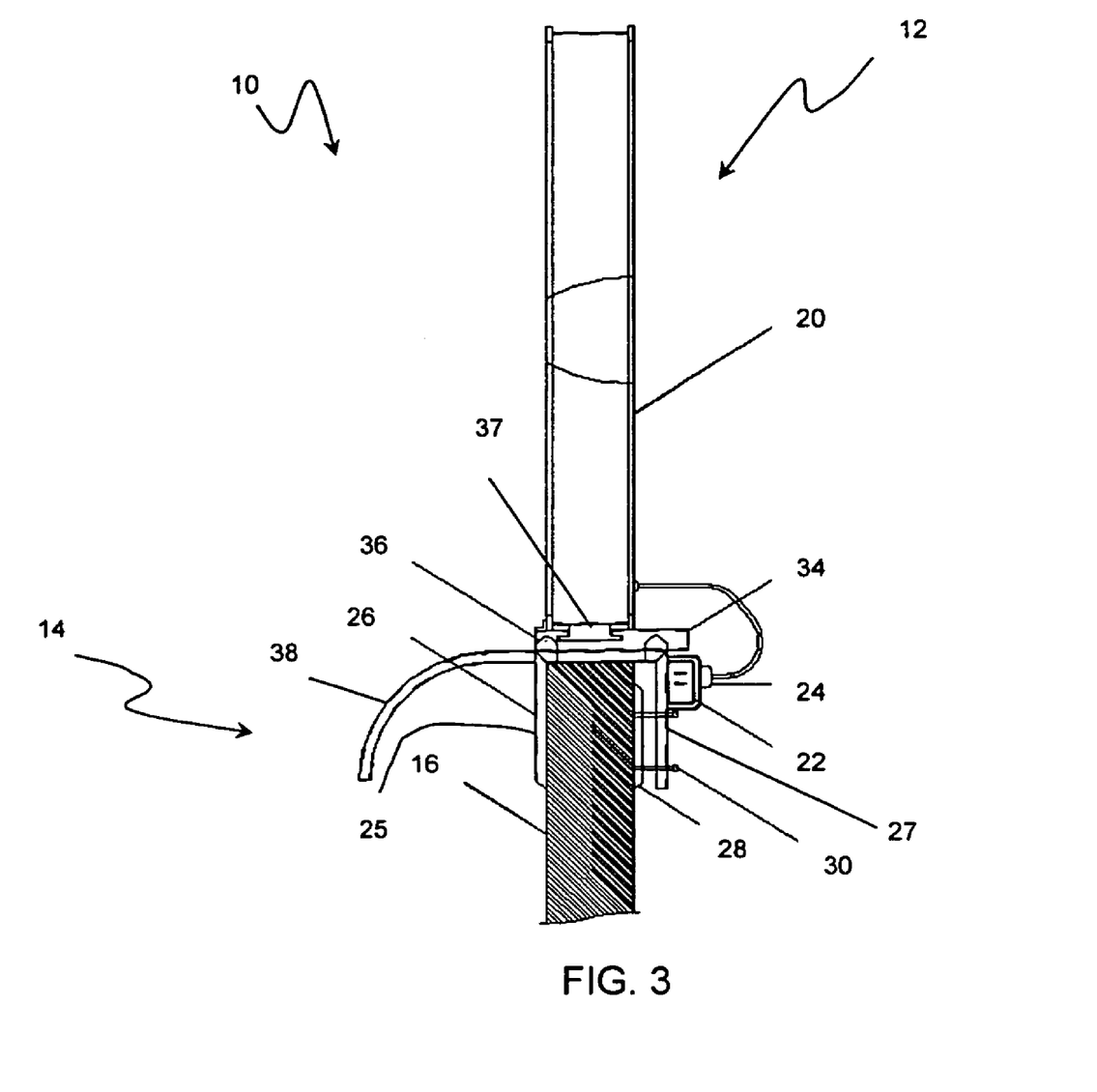
FIG. 3 is a side view of the wind turbine system of FIG. 1.
Figure 4:
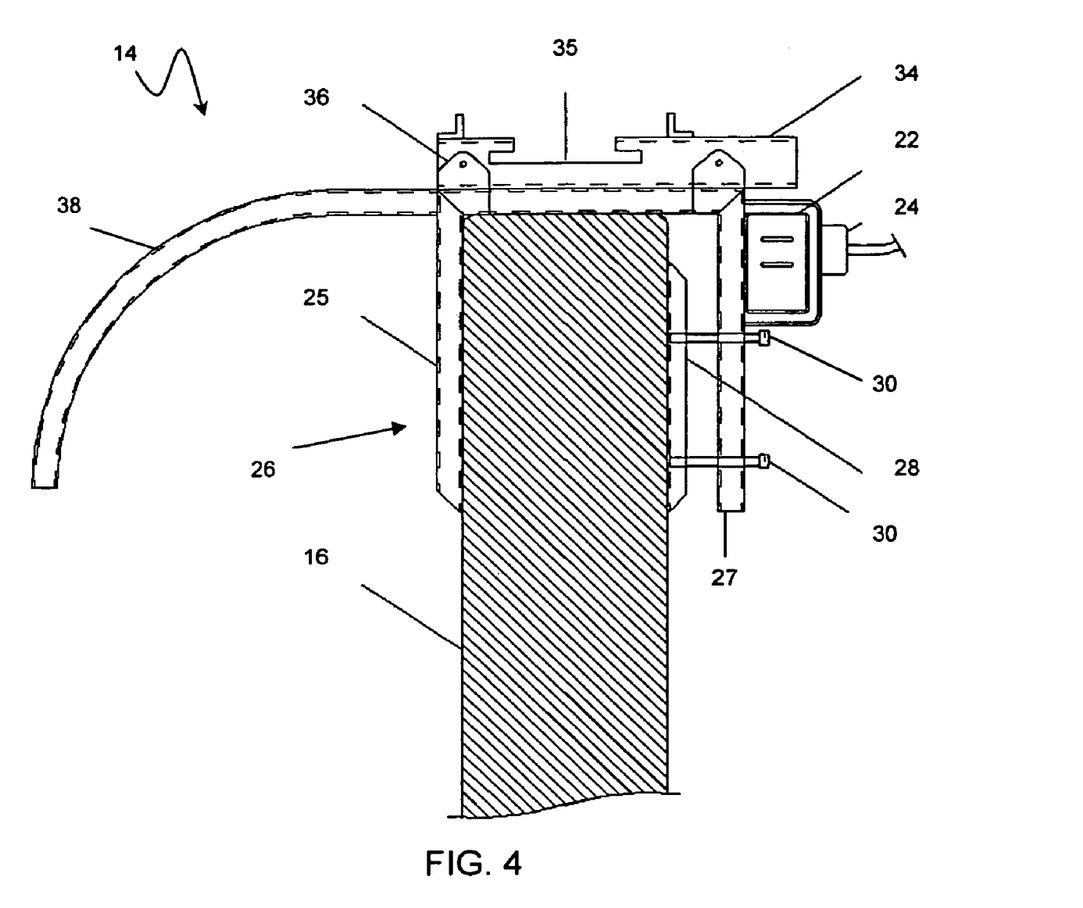
FIG. 4 is a side view of the mounting assembly of FIG. 1.

With reference now to FIGS. 2–4, the mounting assembly 14 allows for easy retrofit attachment to existing structures. In the exemplary embodiment, the mounting assembly includes a U-shaped wall attachment 26 having front and rear arms 25, 27, respectively, that straddle the upper end of the wall. A compression plate 28 is attached to the rear arm of the wall attachment by mounting bolts 30. Upon tightening the mounting bolts, the wall is sandwiched between the compression plate and the first arm of the wall attachment, providing a secure compression attachment to the wall. In this embodiment, each generator is attached to the wall, using two wall attachments. The busway 22 extends along a rearward side of the wall, attached to the rear arms of each of the wall attachments.

The mounting assembly 14 includes breakaway plates 34 disposed between the generator and each wall attachment. The plates define a channel 35 configured to receive the lower end 37 of the housing 20. The channel and the lower end are cooperatively configured to facilitate removable attachment. The plates are affixed to the wall attachments by breakaway tabs 36. In the present embodiment, four tabs are used, two on each longitudinal side of the breakaway plates. The tabs are configured to release the plate from wall attachment when under excessive forces. In this manner, the generator system will not transfer excessive loads (e.g., earthquake loads) that may be damaging to the wall. The tabs can be designed so that side forces are controlled so that the generator system will favor falling onto the roof.

With continued reference to FIGS. 1–4, the generator system includes a fairing 38 extending from the front side of the vertical wall 16. In the exemplary embodiment, the system is mounted to a wall having a length-to-height ratio of at least 5:1. For example, wind flow normal to very long commercial/warehouse buildings can result in two-dimensional flow characteristics over the top of the buildings. The generator system is mounted to the leading edge of the roofline to take advantage of an enhanced wind zone created as wind accelerates over the wall. When wind encounters the wall, it will accelerate at the roofline by 15 to 20 percent over the ambient wind flow. By exploiting this aerodynamically enhanced wind zone, site feasibility is greatly enhanced. The fairing aids in directing wind flow towards the rotors and preventing updraft from the leading wall of the building influencing the flow into the rotor, creating excessive turbulence. Also, each generator assembly can include grills (not shown) on its front and back sides. The grills protect the rotor from object strikes. They also obscure the rotors from view and inhibit glare off the rotors.

The rotor 18 is mounted within the housing 20 such that its axis of rotation is generally horizontally oriented. In the exemplary embodiment, the rotor is about four feet in diameter and includes four blades; however, the number, size and aerodynamic configuration of the blades can be optimized for different installation needs. Rotation of the rotor drives the generator set, inducing the generation of electrical current. The generator set can be aligned along the rotor's axis of rotator or otherwise in mechanical connection to the rotor. For example, the generator set can be mounted at the hub of the rotor, or placed in the periphery of the housing connect to the rotor by a chain or other motive connection.

The generator set converts mechanical energy from the rotor's rotation into electrical energy. Generally speaking, the generator set includes an electrical generator, e.g., alternator, and associated electronics to conform the generated electricity within prescribed parameters. Various other generator configurations known in the art can be used, such as those available from Southwest Windpower Inc., of Flagstaff, Ariz. Selection of a particular generator configuration can be based upon a number of factors and trade-offs, such as cost, efficiency, prevailing wind parameters, electrical power requirements, and size.

For example, in the exemplary embodiment, the generator set can include a three-phase brushless permanent magnet alternator, along with associated electronics to rectify the power to direct current and a voltage regulator to keep voltage from rising over a set point such as 48 volts. At a continuous wind speed of 20 mph, the generator can generate about 200 watts of direct current at a regulated voltage of 48 volts. Since power equals voltage multiplied by current, each wind turbine in this example would provide a direct current of about 4.2 amps. The electrical flow from numerous individual wind turbines can be accumulated by connection to the busway 22. In this embodiment, the busway preferably includes embedded electronics to restrict the flow of electricity in one direction. For example, with 50 small wind turbines attached to a single busway, there will be 10 kilowatts of power, at 48 volts and 210 amps flowing through the busway. An electrical junction box can be positioned at the end of the busway to receive this electricity and direct it, as needed, such as to another electrical infrastructure (power line), an electrical storage device (battery) or to a motor via standard off-the-shelf circuitry specified for each receiving application.

Figure 5:
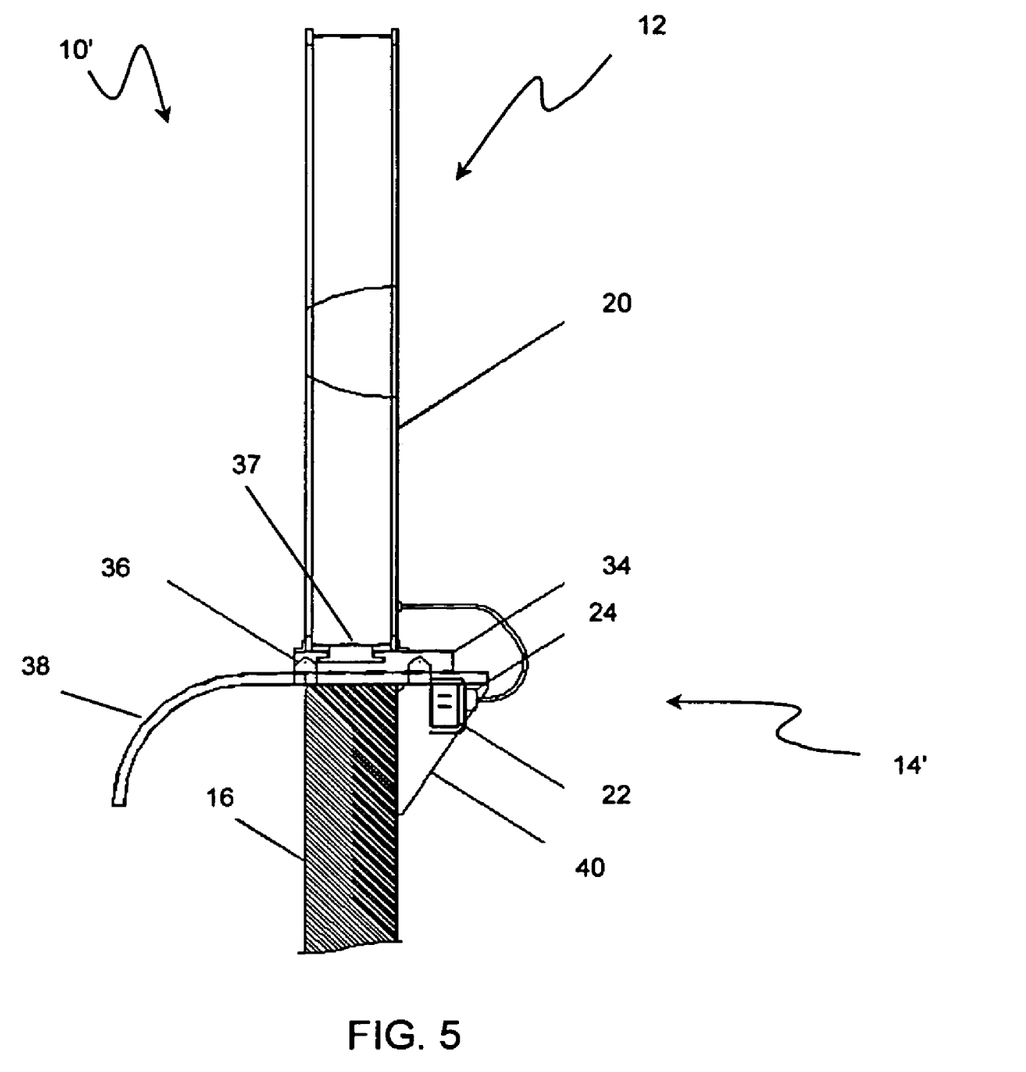
FIG. 5 is a rear view of a second embodiment of a wind turbine system in accordance with the invention, depicting wind generators and mounting assembly including expansion bolts for mounting to the wall.
Figure 6:
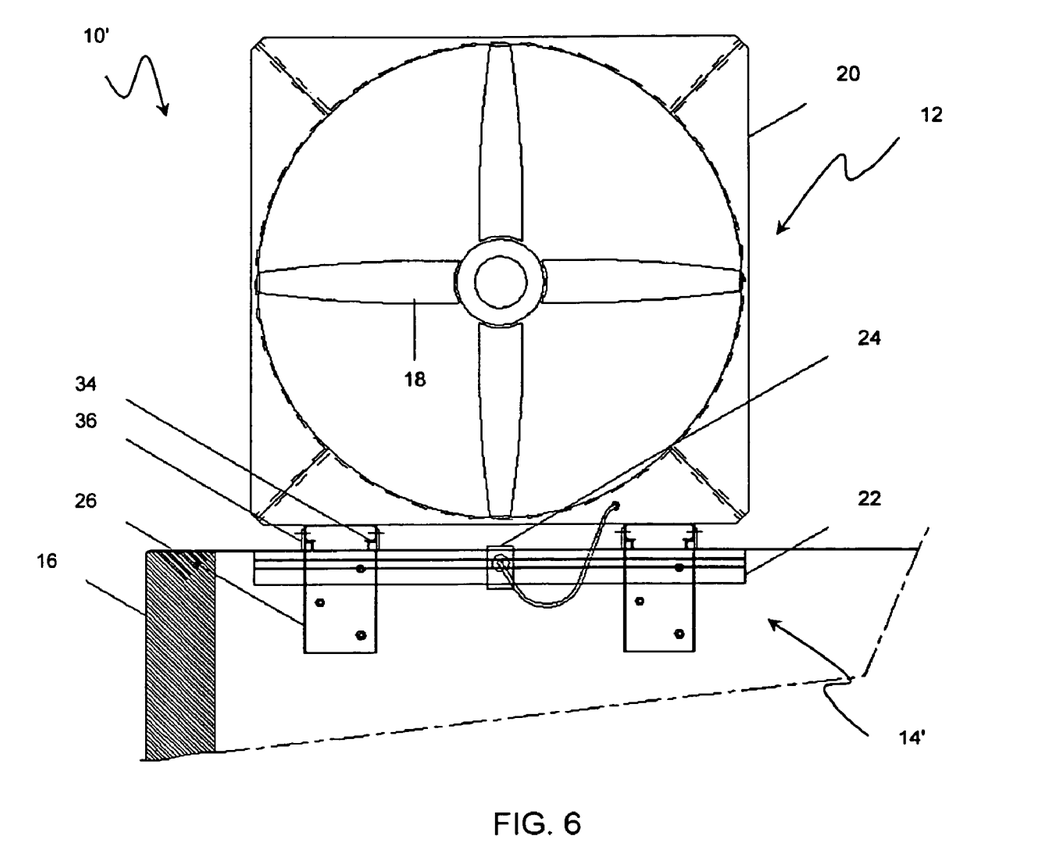
FIG. 6 is a side view of the wind turbine system of FIG. 5.
Figure 7:
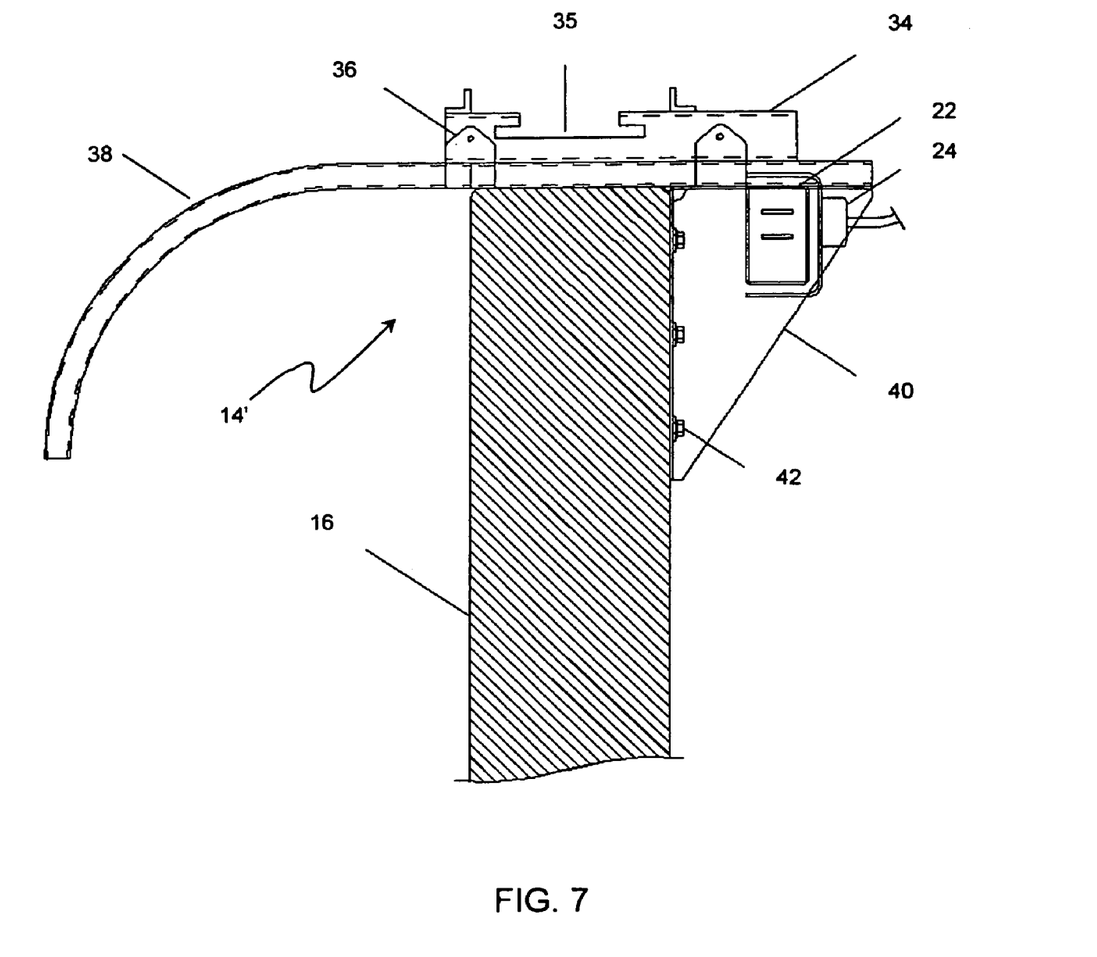
FIG. 7 is a side view of the mounting assembly of the wind turbine system of FIG. 5.

With reference now to FIGS. 5–7, another embodiment of a mounting assembly 14' is shown. This embodiment includes a wall attachment 40 having a rear arm configured to be attached to the wall 16 by expansion bolts 42. As best seen in FIG. 7, in this embodiment the wall attachment does not have a front arm, however, one can be provided as needed. Tabs 36 extend between a horizontal portion of the wall attachment and the breakaway plate 34. The tabs configured as discussed above. In this embodiment, the fairing is configured to extend directly from the horizontal portion of the wall attachment.

Figure 8:
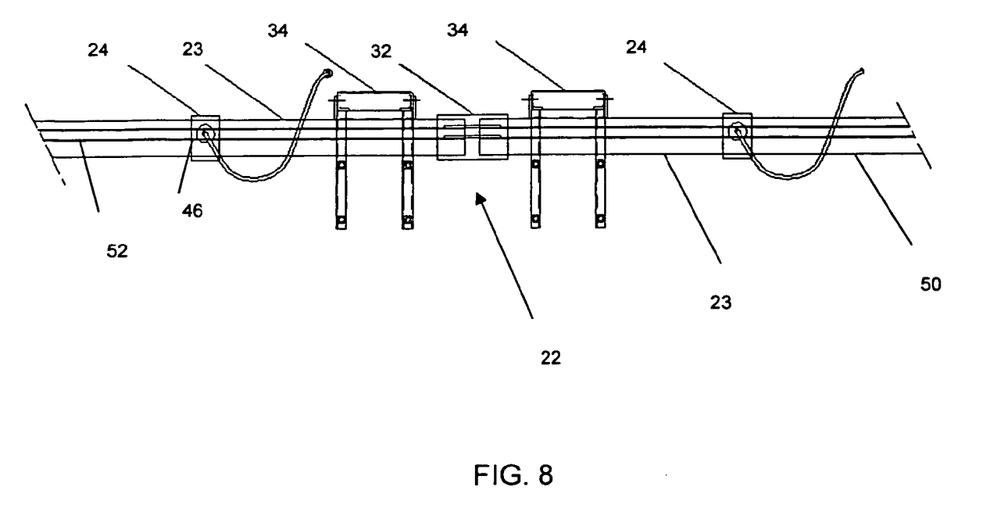
FIG. 8 is a rear view of the busway of the wind turbine system of FIG. 1.

With reference now to FIG. 8, the busway 22 can include a plurality of sections 23 connected by the interconnects 32, allowing for ease of assembly and maintenance. In certain embodiments, the system can include commercially available busway systems, such as those from Zucchini SpA., of Brescia, Italy. The sections include an outer casing 50 housing conductive bars 52. The outer casing can be made of galvanized steel or other protective materials and, in the exemplary embodiment, the outer casing provides an IP 55 protection level. Each section includes five conductive bars 52 extending the length thereof. In this embodiment, the conductive bars are formed of aluminum; however, other conductive materials can be used. The sections define plug openings 46 spaced along the length thereof for receiving plugs 24 of the generators 12 to provide electrical conductivity to the conductive bars. The plugs are configured to connect to the bars in two pairs of two bars, with the fifth bar used as a ground. In the exemplary embodiment, the conductive bars are rated for about 160 amperes, and the plugs are each rated for about 32 amperes. Section interconnects 32 join adjacent sections and are configured to maintain electrical conductive of the conductive bars through the entire length of the busway. In other embodiments, adjacent sections of the busway can be configured to connect to each other without the need of separate interconnects. The busway configuration can be varied to accommodate structural and electrical requirements of particular embodiments.

Figure 9:
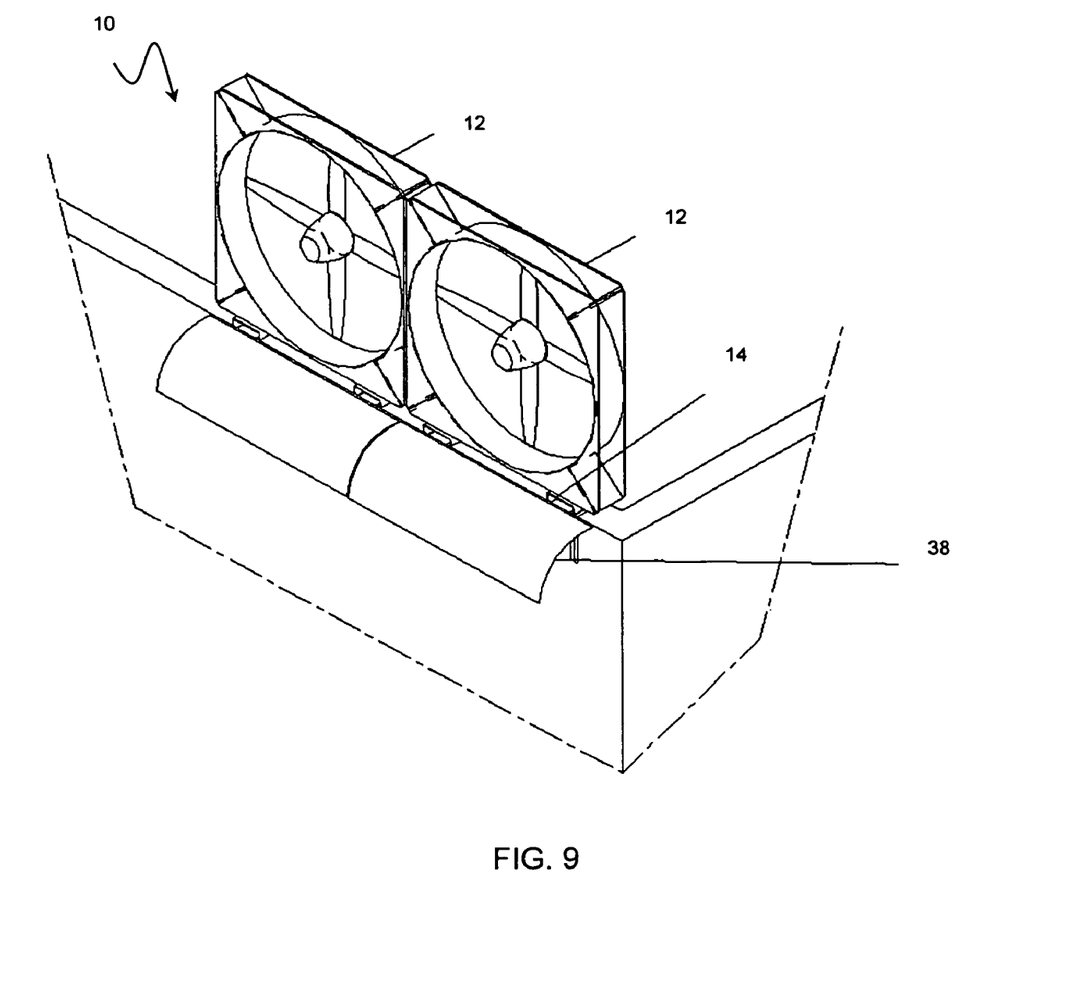
FIG. 9 is a perspective view depicting two generators mounted to a wall of a building in accordance with the invention.
Figure 10:
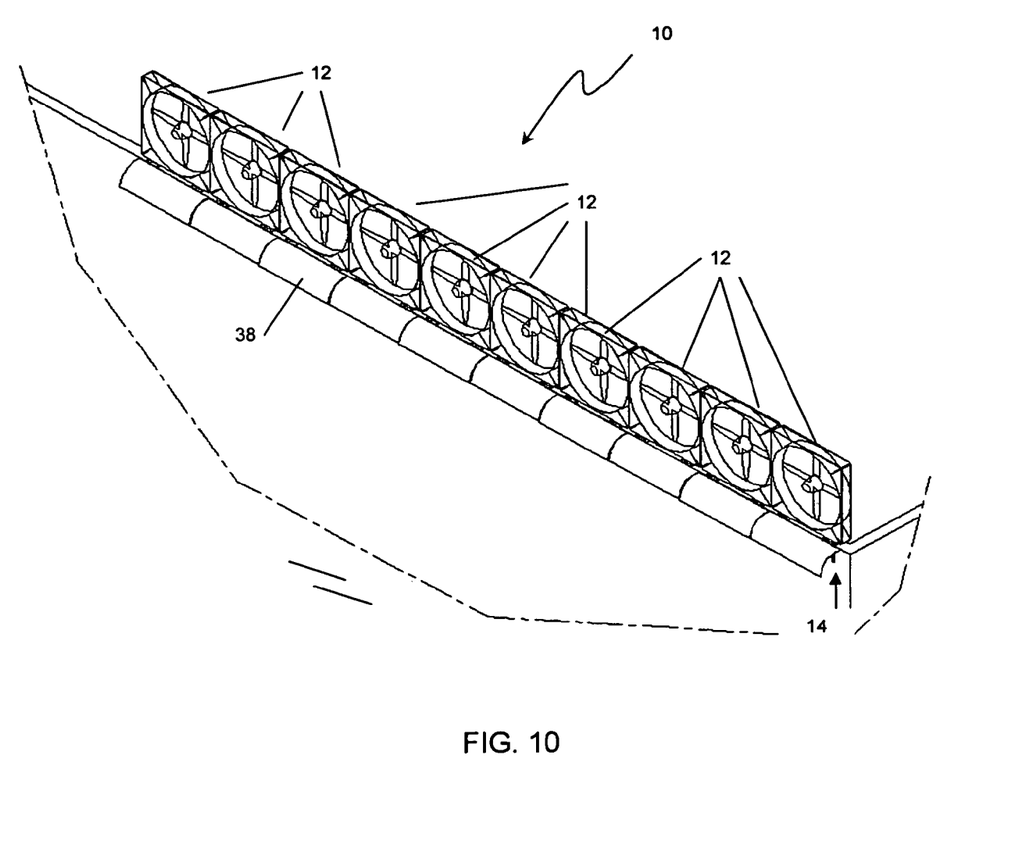
FIG. 10 is a perspective view depicting a plurality of wind generators mounted to a wall of a building in accordance with the invention.
Figure 11:
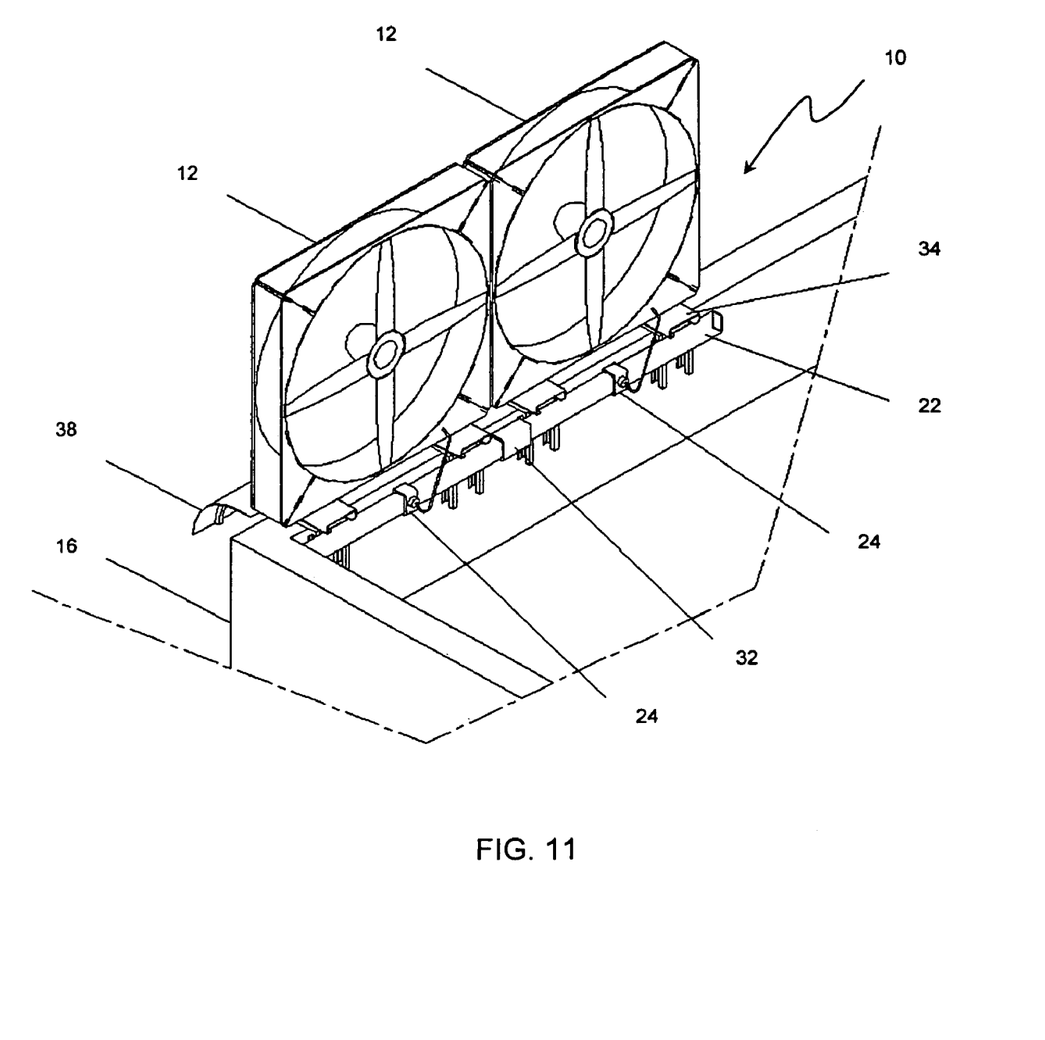
FIG. 11 is a rear view of the wind generators of FIG. 9.
Figure 12:
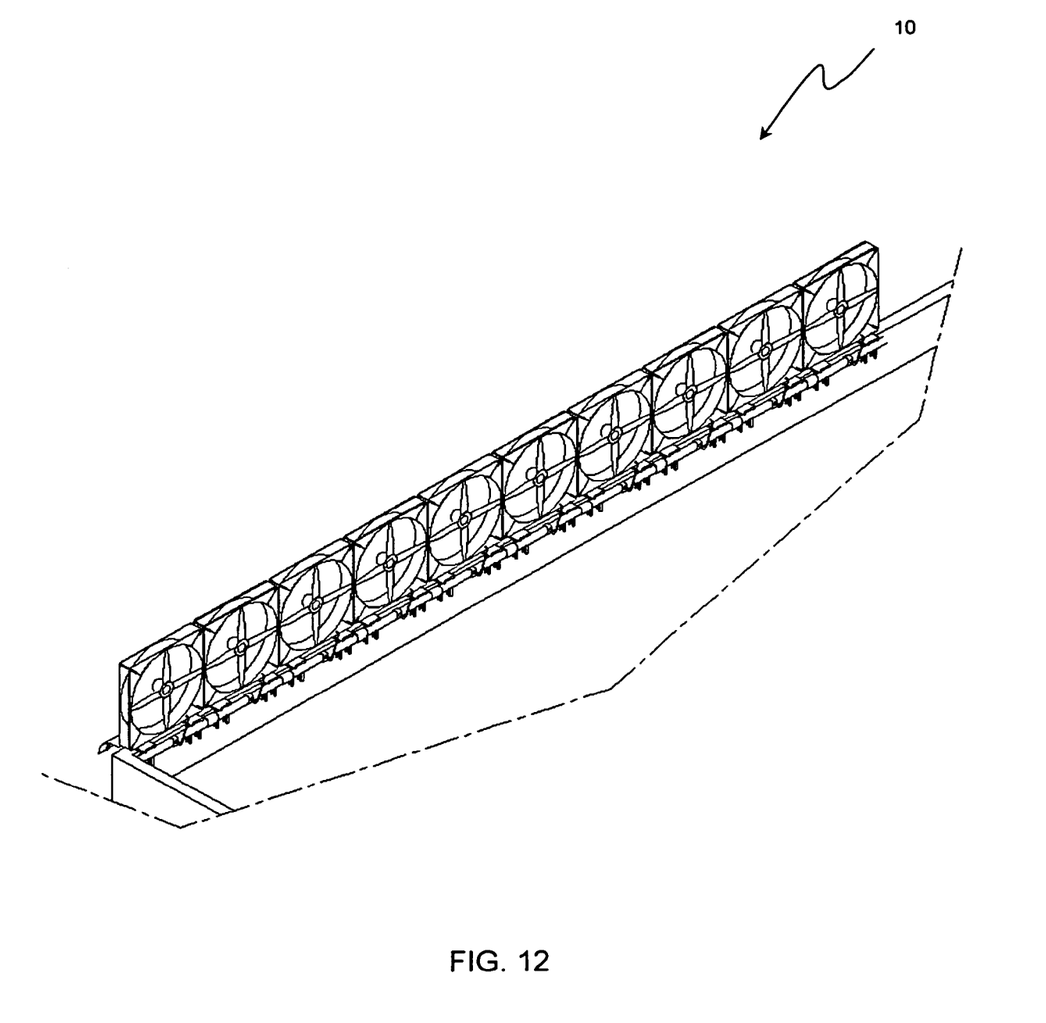
FIG. 12 is a rear view of the wind generators of FIG. 10.

Various system installations in accordance with the present invention are shown in FIGS. 9–12. The system can be easily scaled to meet a user's particular needs and can otherwise be tailored for a specific building and other parameters. As shown in FIGS. 10 and 12, the system can be sized to extend length of the wall or, as shown in FIGS. 9 and 11, can be selectively located with a prescribed number of generator assemblies, as desired.

It should be appreciated from the foregoing that the present invention provides a wind turbine system, and related method, that exploits an aerodynamically enhanced wind zone of a building by aligning a wind turbine generator, and preferably a plurality thereof, along the leading edge of its roofline. Each generator includes a structural support, a wind turbine rotor and a generator set. The system includes a mounting assembly that attaches the generators to the upper edge of a wall of the building and that allows for easy retrofit attachment to existing structures. The system includes a busway extending along the mounting assembly and configured to provide electrical contact between the generator assembly and the electrical infrastucture of the building. Preferably, the generator assembly is mounted such that the rotor's axis of rotation is in a generally horizontal orientation. The system may further include a fairing attach to the mounting assembly and configured to extend outward from a front side of the wall. The fairing can be provided with a downwardly curved planar shape to facilitate airflow towards the rotors.

Although the invention has been disclosed in detail with reference only to the preferred embodiments, those skilled in the art will appreciate that various other embodiments of can be provided without departing from the scope of the invention. Accordingly, the invention is defined only by the claims set forth below.

We claim:

1. A building, comprising:
   an electrical infrastructure;
   a vertical wall having a body and an upper edge and further having a length-to-height ratio of at least 5:1, wherein the body deflects ambient wind upward past the upper edge, creating an aerodynamically enhanced wind zone above the building; and
   a wind turbine system positioned directly above the upper edge of the vertical wall and electrically coupled to the electrical infrastructure; the wind turbine system including a wind-powered generator disposed in the aerodynamically enhanced wind zone for generating electricity and delivering it to the electrical infrastructure.

2. A building as defined in claim 1, wherein the vertical wall is configured to cause the wind to accelerate in proximity to the vertical wall's upper edge, to a speed at least 15 percent greater than the speed of the ambient wind flow.

3. A building as defined in claim 1, wherein the wind turbine system is mounted to the vertical wall.

4. A building, comprising:
   an electrical infrastructure;
   a vertical wall having a body and an upper edge and further having a length-to-height ratio of at least 5:1, wherein the body is configured to deflect ambient wind upward past the upper edge, to create an aerodynamically enhanced wind zone above the vertical wall's upper edge; and
   a wind turbine system positioned directly above the upper edge of the vertical wall and electrically coupled to the electrical infrastructure, wherein the wind turbine system includes
      a plurality of generator assemblies, each generator assembly having a structural support, a rotor mounted for rotation relative to the structural support and responsive to wind moving generally horizontally over the upper edge of the vertical wall, and an electrical generator driven by the rotor to generate an electrical current, and
      a mounting assembly disposed between the plurality of generator assemblies and the upper edge of the vertical wall, for mounting the generator assemblies to the vertical wall, the mounting assembly including an elongated busway extending along the upper edge of the vertical wall.

5. A building as defined in claim 4, wherein the vertical wall is configured to cause the wind to accelerate in proximity to the vertical wall's upper edge, to a speed at least 15 percent greater than the speed of the ambient wind flow.

6. A building as defined in claim 4, wherein the mounting assembly is configured to mount the plurality of generators adjacent to one another.

7. A building as defined in claim 4, wherein the mounting assembly further includes an upper side that defines a channel, and each generator assembly includes a lower end configured for a snap-fit attachment into the channel.

8. A building as defined in claim 4, wherein the mounting assembly further includes a plurality of wall attachments, each wall attachment being disposed between the upper edge of the vertical wall and one of the plurality of generator assemblies.

9. A building as defined in claim 8, wherein the mounting assembly further includes an upper side that defines a channel, and each generator assembly includes a lower end configured for a snap-fit attachment into the channel such that the rotor's axis of rotation has a generally horizontal orientation.

10. A building, comprising:
    an electrical infrastructure;

a vertical wall having a body and an upper edge, wherein the body is configured to deflect ambient wind upward past the upper edge, to create an aerodynamically enhanced wind zone above the vertical wall's upper edge; and a wind turbine system positioned directly above the upper edge of the vertical wall and electrically coupled to the electrical infrastructure, wherein the wind turbine system includes a plurality of generator assemblies, each generator assembly having a structural support, a rotor mounted for rotation relative to the structural support and responsive to wind moving generally horizontally over the upper edge of the vertical wall, and an electrical generator driven by the rotor to generate an electrical current, and a mounting assembly disposed between the plurality of generator assemblies and the upper edge of the vertical wall, for mounting the generator assemblies to the vertical wall, the mounting assembly including an elongated busway extending along the upper edge of the vertical wall, wherein each generator assembly includes an interconnect for removably attaching the assembly to the busway.

11. A building as defined in claim 10, wherein the interconnect of each of the plurality of generator assemblies is configured for a snap-fit attachment to the busway, such that the interconnect can be positioned at a selected location along the busway while maintaining electrical contact with the busway.

12. A building, comprising:

an electrical infrastructure;

a vertical wall having a body and an upper edge, wherein the body is configured to deflect ambient wind upward past the upper edge, creating an aerodynamically enhanced wind zone above the vertical wall; and a wind turbine system positioned directly above the upper edge of the vertical wall and electrically coupled to the electrical infrastructure, wherein the wind turbine system includes a generator assembly having a structural support, a rotor mounted for rotation relative to the structural support about a generally horizontal rotation axis and responsive to wind moving generally horizontally over the upper edge of the vertical wall, and an electrical generator driven by the rotor to generate an electrical current; and a mounting assembly for mounting the generator assembly to the vertical wall, including a wall attachment having a rear arm configured to be secured to a rear side of an upper end of the vertical wall, a plate disposed between the generator assembly and the wall attachment, a plurality of breakaway tabs attached to both the wall attachment and the plate, the breakaway tabs being configured to release the plate from wall attachment when they receive a predetermined amount of force, and a busway extending along the mounting assembly and configured to electrically connect the generator assembly to the electrical infrastructure.

13. A building as defined in claim 12, wherein the vertical wall has a length-to-height ratio of at least 5:1.

14. A building as defined in claim 12, wherein the vertical wall is configured to cause the wind to accelerate in proximity to the vertical wall's upper edge, to a speed that is at least 15 percent greater than the speed of the ambient wind flow.

15. A building as defined in claim 12, and further comprising a fairing attached to the mounting assembly and configured to extend outward from a front side of the vertical wall.

16. A building as defined in claim 12, wherein the generator assembly is mounted such that the rotor's axis of rotation has a generally horizontal orientation.

17. A building as defined in claim 12, wherein the rear arm of the wall attachment is configured to be secured directly to a rear side of the vertical wall.

* * * * *